(12) United States Patent
Pang

(10) Patent No.: US 11,956,578 B2
(45) Date of Patent: Apr. 9, 2024

(54) MIDDLE FRAME AND TERMINAL

(71) Applicant: BEIJING XIAOMI MOBILE SOFTWARE CO., LTD., Beijing (CN)

(72) Inventor: Chenglin Pang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 238 days.

(21) Appl. No.: 17/520,449

(22) Filed: Nov. 5, 2021

(65) Prior Publication Data

US 2022/0312093 A1 Sep. 29, 2022

(30) Foreign Application Priority Data

Mar. 26, 2021 (CN) .......................... 202110327129.3

(51) Int. Cl.
*H04R 1/02* (2006.01)
*H01Q 1/24* (2006.01)
*H01Q 1/44* (2006.01)

(52) U.S. Cl.
CPC ............. *H04R 1/023* (2013.01); *H01Q 1/243* (2013.01); *H01Q 1/44* (2013.01); *H04R 2499/15* (2013.01)

(58) Field of Classification Search
CPC .... H04R 1/023; H04R 2499/15; H01Q 1/243; H01Q 1/44
USPC ........................................................ 381/334
See application file for complete search history.

(56) References Cited

U.S. PATENT DOCUMENTS

| | | | | |
|---|---|---|---|---|
| 9,379,433 | B2* | 6/2016 | Ying | .................. H01Q 1/48 |
| 2003/0068987 | A1* | 4/2003 | Dufosse | ............... H04M 1/035 |
| | | | | 455/90.1 |
| 2004/0171404 | A1* | 9/2004 | Annamaa | ............. H01Q 9/0421 |
| | | | | 455/575.1 |
| 2005/0024271 | A1 | 2/2005 | Ying et al. | |
| 2005/0233781 | A1 | 10/2005 | Erixon et al. | |
| 2008/0037770 | A1* | 2/2008 | Emmert | ............... H04M 1/026 |
| | | | | 379/433.01 |
| 2011/0003623 | A1* | 1/2011 | Na | ............................ H01Q 7/00 |
| | | | | 455/575.1 |
| 2011/0237309 | A1* | 9/2011 | Shoji | ........................ H01Q 9/42 |
| | | | | 343/893 |
| 2012/0229347 | A1* | 9/2012 | Jin | .......................... H01Q 21/28 |
| | | | | 343/702 |
| 2014/0078008 | A1* | 3/2014 | Kang | ..................... H01Q 1/243 |
| | | | | 343/702 |
| 2014/0145886 | A1* | 5/2014 | Cui | ......................... H01Q 1/243 |
| | | | | 343/702 |

(Continued)

FOREIGN PATENT DOCUMENTS

CN 209375706 U 9/2019

OTHER PUBLICATIONS

Extended European Search Report issued in Application No. 21209254.8, dated May 3, 2022,(11p).

*Primary Examiner* — William J Deane, Jr.
(74) *Attorney, Agent, or Firm* — Arch & Lake LLP

(57) ABSTRACT

A middle frame includes: a border antenna which is provided with a sound output hole, a first mounting site for arranging a circuit board which is connected with a feed point of the border antenna, and a second mounting site for arranging an audio assembly which is connected with the sound output hole through a sound output channel, the first mounting site is between the border antenna and the second mounting site.

15 Claims, 5 Drawing Sheets

(56) References Cited

U.S. PATENT DOCUMENTS

2015/0200462 A1* 7/2015 Leppaluoto ............ H01Q 5/371
　　　　　　　　　　　　　　　　　　　　　　343/702
2016/0233581 A1* 8/2016 Kim ....................... H01Q 15/14
2017/0250460 A1* 8/2017 Shin .................... H04M 1/0277
2019/0363425 A1* 11/2019 Huang ................... H01Q 1/243

* cited by examiner

MIDDLE FRAME AND TERMINAL

CROSS REFERENCE TO RELATED APPLICATION

The present application is based on and claims priority to Chinese patent application No. 2021103271293, filed on Mar. 26, 2021, the entire contents of which are incorporated herein by reference for all purposes.

BACKGROUND

With the development of a terminal, antenna types and antenna frequency bands which the terminal needs to meet are increased day by day, which provides a huge challenge for the space with high cost in the terminal. In addition, due to gradually increasing functions of the terminal and high requirements on the process for the light, thin and integral appearance of the terminal, the storage space for an antenna in terminal equipment is further narrowed. Therefore, how to further increase the arrangement position of the antenna by utilizing the limited terminal space is one of the design difficulties of the antenna of the terminal.

SUMMARY

The disclosure relates to the technical field of communication, and relates to a middle frame and a terminal.

According to a first aspect of the disclosure, a middle frame is provided, and includes: a border antenna including a feed point configured to be connected with a circuit board; a sound output hole in the border antenna, the sound output hole being configured to be connected with an audio assembly; a first mounting site configured to accommodate the circuit board; a second mounting site configured to accommodate the audio assembly connected with the sound output hole through a sound output channel; and the first mounting site is between the border antenna and the second mounting site.

According to a second aspect of the disclosure, a terminal is provided, and includes: the middle frame according to the first aspect of the present disclosure; a circuit board disposed on the first mounting site of the middle frame; and an audio assembly disposed on the second mounting site of the middle frame.

It should be understood that both the above general description and the following detailed description are exemplary and explanatory only and cannot limit the disclosure.

BRIEF DESCRIPTION OF THE DRAWINGS

The accompanying drawings, which are incorporated in the specification and constitute a part of the specification, illustrate examples conforming to the disclosure and, together with the description, serve to explain the principles of the disclosure.

DETAILED DESCRIPTION

Examples will be illustrated in detail herein, and examples of the embodiments are illustrated in the accompanying drawings. When the following description involves the accompanying drawings, the same numeral in different drawings represents the same or similar elements unless otherwise indicated. The implementations described in the following examples do not represent all implementations consistent with the disclosure. On the contrary, they are examples of apparatuses consistent with some aspects of the disclosure as detailed in the appended claims.

In the description of the disclosure, it needs to be understood that the terms "center", "upper", "lower", "top", "bottom", "inner", "outer" and the like indicate an orientation or positional relationship based on the orientation or positional relationship of a user when using a terminal.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Figure 1:
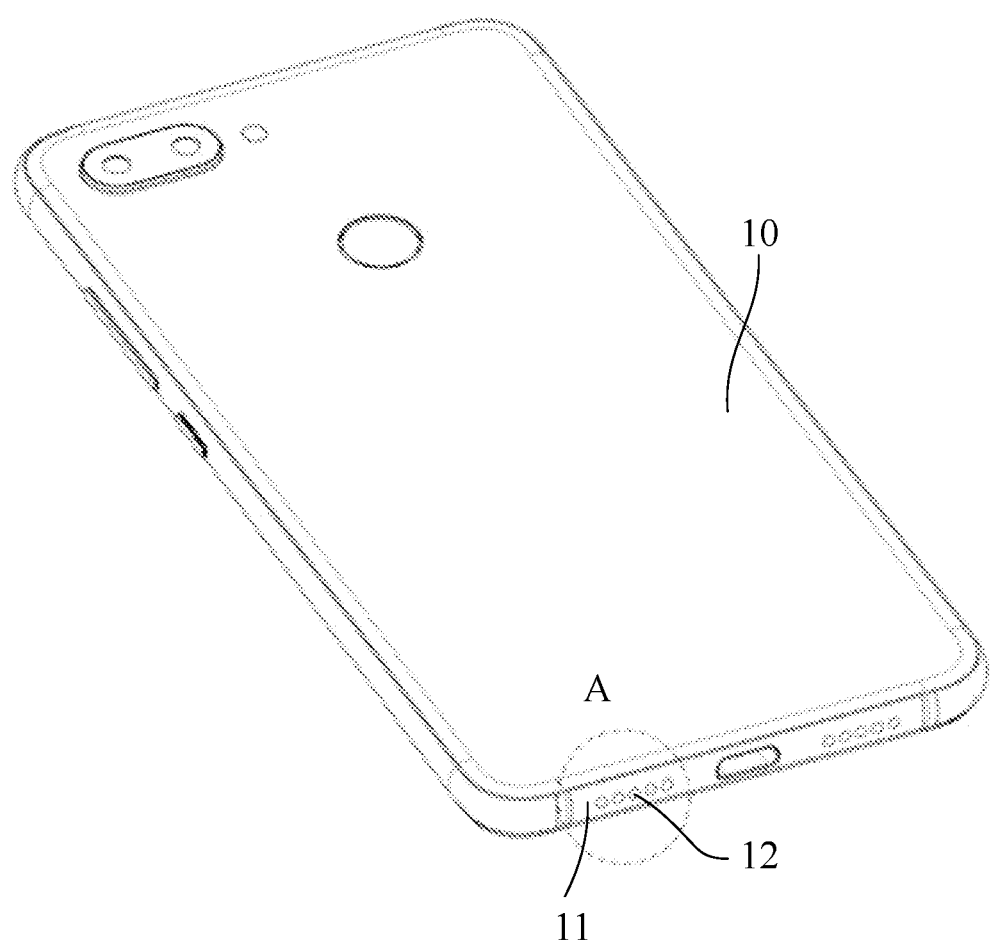
FIG. 1 is a structural schematic diagram of a terminal according to one or more examples of the present disclosure.
Figure 2:
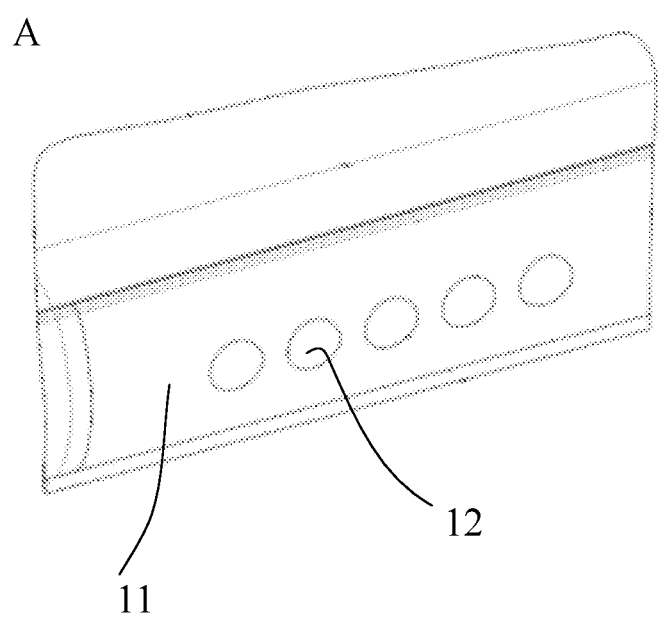
FIG. 2 is an enlarged view of a part A in FIG. 1.
Figure 3:
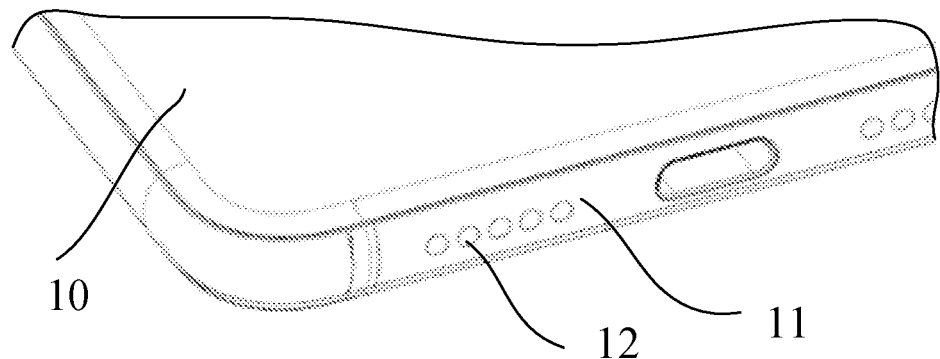
FIG. 3 is a first structural schematic diagram of a part of the terminal according to one or more examples of the present disclosure.
Figure 4:
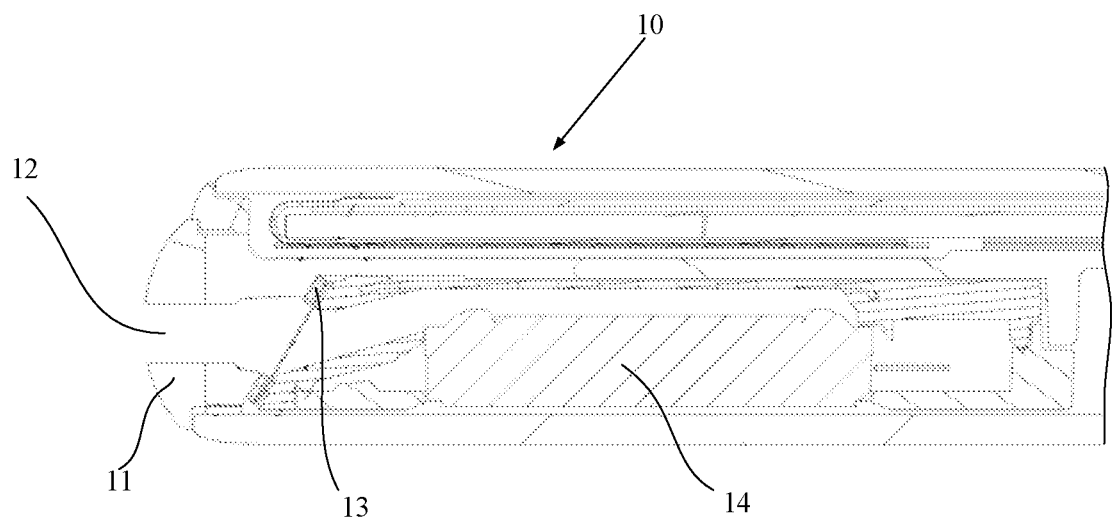
FIG. 4 is a second structural schematic diagram of a part of the terminal according to one or more examples of the present disclosure.
Figure 5:
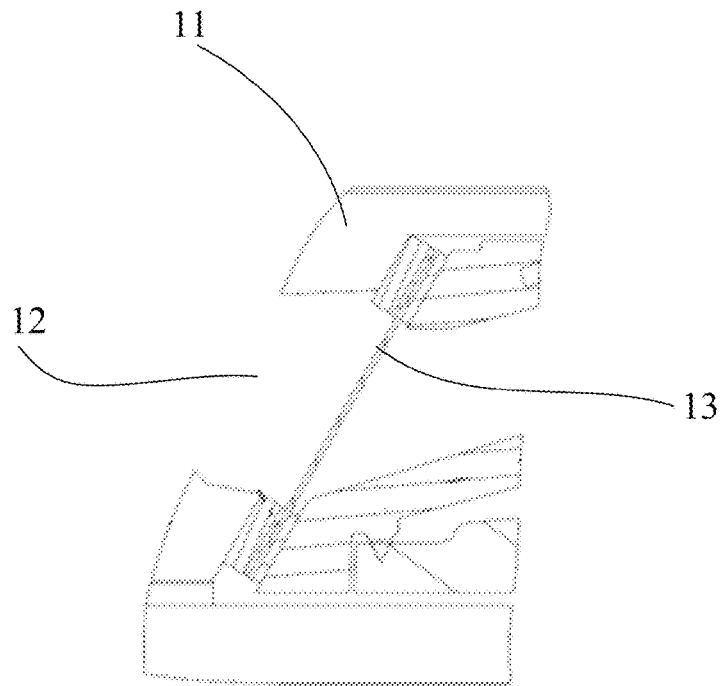
FIG. 5 is a third structural schematic diagram of a part of the terminal according to one or more examples of the present disclosure.

As shown in FIG. 1 to FIG. 5, since an audio output assembly 14 needs to be arranged at a position of a border portion 11 with sound holes 12, an end, facing the center position of a terminal 10, of the sound holes 12 needs to be sealed by a sealing component 13. As shown in FIG. 4 and FIG. 5, the sealing component 13 is close to an edge of a middle frame, and the border portion 11 with the sound holes 12 does not have an available space. If a conductive border of the terminal 10 is used as a radiation part of an antenna assembly, the border portion 11 with the sound holes 12 needs to be kept away, and antenna assemblies are distributed in portions, except for the sound holes 12, of the border portion. In order to further fully utilize the space of the terminal, distribution positions of antennas are increased, in the example of the disclosure, the border is further modified, the border portion 11 with the sound holes 12 is utilized, and the following technical solution is proposed.

An example of the disclosure provides a middle frame 100, and the middle frame 100 includes:
- a border antenna 110 including a feed point 141 configured to be connected with a circuit board 130;
- a sound output hole 112 in the border antenna 110, the sound output hole 112 being configured to be connected with an audio assembly 170;
- a first mounting site 111 configured to accommodate the circuit board 130; and
- a second mounting site 121 configured to accommodate the audio assembly 170 connected with the sound output hole 112 through a sound output channel 122; and
- the first mounting site 111 is between the border antenna 110 and the second mounting site 121.

The technical solution provided by the example of the disclosure may include the following beneficial effects: according to the above example, the sound output hole are formed in the border antenna, so that a sound output function of the audio assembly at the border antenna is guaranteed while the purpose of adding the antenna function on the frame of the middle frame is achieved, the space of a border of the middle frame is fully utilized, and antenna distribution positions are increased.

Generally, a border is located at an edge of the middle frame 100 to form a side wall of the middle frame 100.

In some examples, a gap may be formed in the border, and the border is separated by the gap to form the border antenna 110.

The border has conductivity, and unrestrictedly, the conductive border may be a metal or alloy border, or may be made from materials such as aluminum alloy, titanium alloy or stainless steel.

Figure 6:
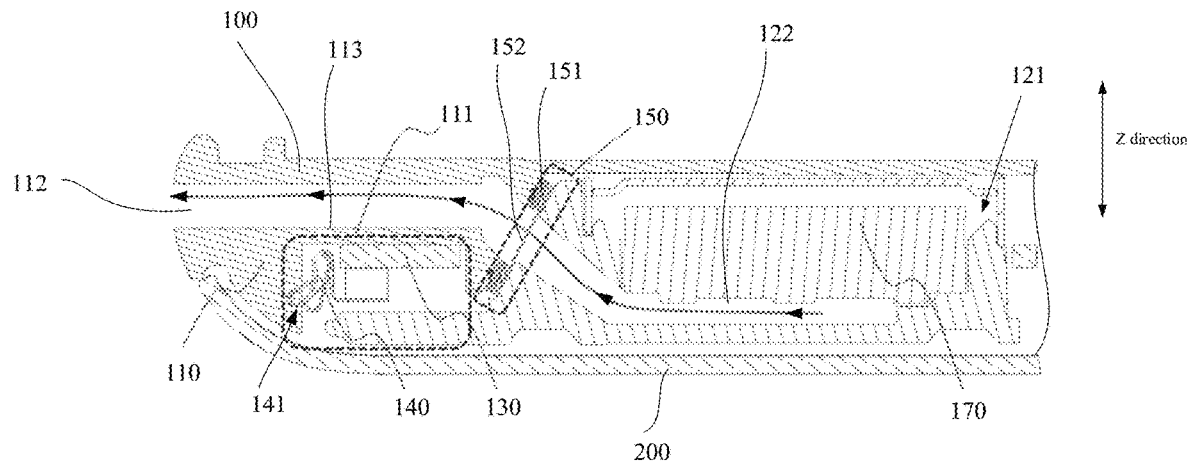
FIG. 6 is a structural schematic diagram of a part of the terminal illustrated according to one or more examples of the present disclosure.
Figure 7:
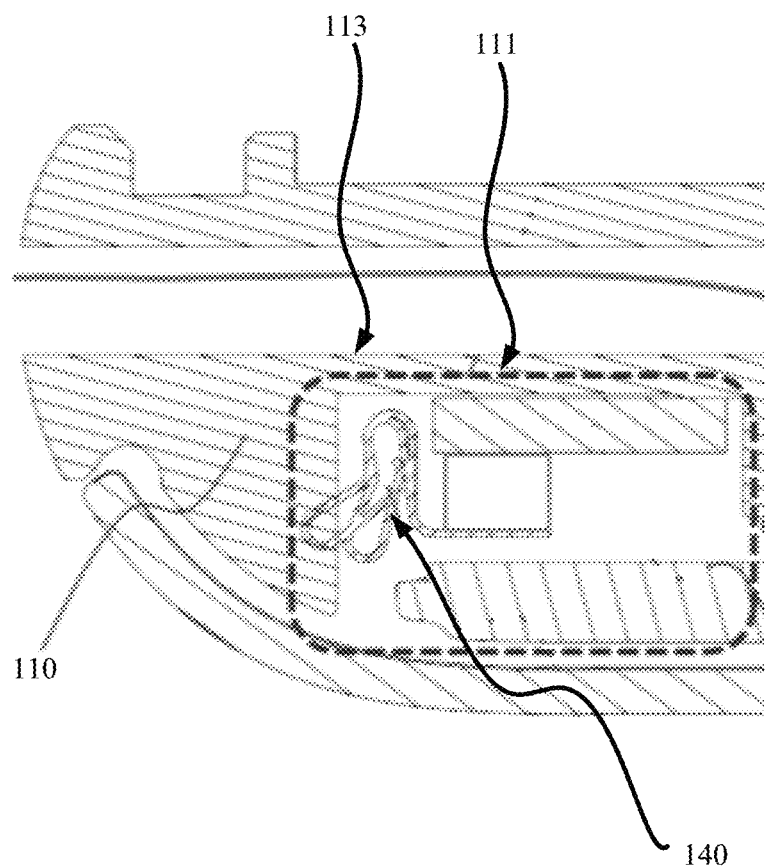
FIG. 7 is a partial enlarged view of FIG. 6.
Figure 8:
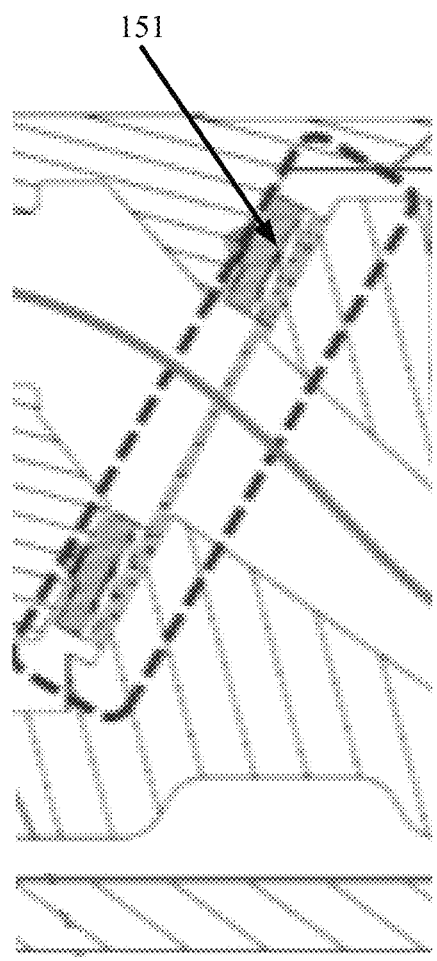
FIG. 8 is a partial enlarged view of FIG. 6.
Figure 9:
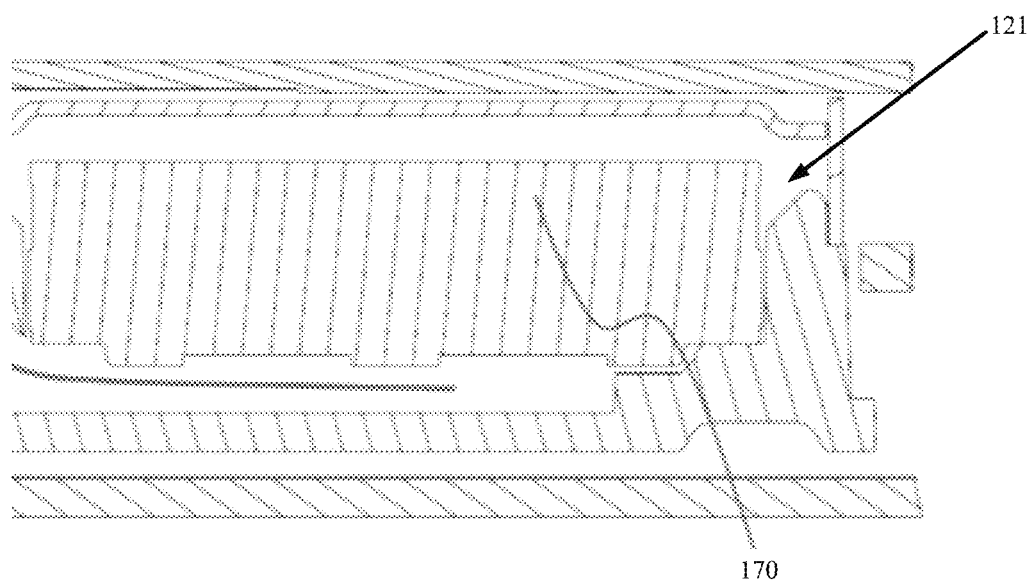
FIG. 9 is a partial enlarged view of FIG. 6.

As shown in FIG. 6, the first mounting site 111 used for mounting the circuit board 130 is formed at the portion close to the middle frame 100 with the sound output hole 112, and the circuit board 130 includes a radio-frequency circuit. The circuit board 130 is electrically connected with the feed point 141 of the border antenna 110 to guarantee that the border antenna 110 receives and transmits wireless signals.

In some examples, the conductive border may be provided with a plurality of gaps, so that more parts of the conductive frame can serve as the border antenna 110. A part of the conductive border directly serves as the border antenna 110, so that the internal space of the terminal occupied by an antenna is reduced, which is beneficial to saving the space of the terminal.

In order to guarantee the strength of the middle frame 100 and reduce a probability of weakening the strength of the middle frame 100 due to the gaps, the gaps are filled with insulators.

Unrestrictedly, the gaps are filled with a liquid insulation material in an injection molding mode, and after the liquid insulation material is solidified, an insulation filler is formed. The gaps are filled with the insulation filler, so that on the one hand, border antenna 110 at various portions are connected, and on the other hand, the strength of the whole conductive border is also guaranteed.

The insulation filler may be an insulation material such as resin or a silicate compound.

In some examples, the sound output hole 112 are formed in the border antenna 110, or, the border with the sound output hole 112 serves as a border antenna 110, so that a part of the border of the middle frame 100 has an antenna function, and also has a sound output function. While the sound output function of the audio assembly 170 at the position of the border antenna 110 is guaranteed, the purpose of adding the antenna function for the border of the middle frame 100 is achieved, the space of the border of the middle frame 100 is fully utilized, and the antenna distribution positions are increased. Further, compared with a mode of adding antennas in the terminal, the middle frame 100 has the advantages that the internal space of the terminal is saved, and the saved internal space in the terminal may be used for additionally arranging other functional devices.

In some examples, the first mounting site 111 and the sound output channel 122 are stacked in a thickness direction of the middle frame 100.

As shown in FIG. 6, the thickness direction of the middle frame 100 is roughly a Z direction. The first mounting site 111 and the sound output channel 122 are stacked in the Z direction, so that the circuit board 130 set on the first mounting site 111 and the sound output channel 122 are stacked in the Z direction and thus the space in the thickness direction of the middle frame 100 is fully utilized.

In some examples, the sound output channel 122 penetrate through the middle frame 100 in a direction along a plane of the middle frame 100.

The direction along the plane of the middle frame 100 refers to a plane where a largest surface of the middle frame 100 is located. When the middle frame 100 is applied to the terminal, the direction of the plane of the middle frame 100 is parallel to a plane where a display screen of the terminal is located. As shown in FIG. 6, the direction of the plane of the middle frame 100 is roughly perpendicular to the Z direction.

As shown in FIG. 6, the sound output channel 122 communicate with the sound output hole 112 and a sound output surface of the audio assembly 170.

Sound waves are transmitted via the sound output channel 122 and are transmitted to the outside of the terminal via the sound output hole 122, the sound output channel 122 and the sound output hole 112 jointly form a sound wave transmitting channel, and a curve arrow in FIG. 6 points to a sound wave transmitting direction.

In FIG. 6, the sound output channel 122 includes a first portion, a second portion and a third portion. The third portion communicates with the sound output surface of the audio assembly 170, the first portion communicates with the sound output hole 112, the second portion is located between the first portion and the third portion, and the second portion makes the first portion and the second portion communicate with each other, the third portion is located below the first portion. The sound output channel 122 with the structure are roughly Z-shaped, and the sound output channel 122 has two turning points. A transmission channel in FIG. 4 only has one turning point. Compared with a sound wave transmitting channel as shown in FIG. 4, the sound output channel 122 in FIG. 6 fully utilize the space of the terminal in the Z direction, and the space utilization rate of the terminal is increased effectively.

In some examples, the feed point 141 of the border antenna 110 is connected with the circuit board 130 through a feed line 140.

A feed line 140 is electrically connected with the circuit board 130 and the border antenna 110 respectively, and the feed point 141 is formed at the position where the feed line 140 is connected with the border antenna 110. Based on this, the border antenna 110 with the sound output hole 112 serves as an antenna—radiation part. When wireless signals are transmitted, current generated by the circuit board 130 is transmitted to the border antenna 110 via the feed line 140, and are converted into electromagnetic waves by the border antenna 110 to be sent out; and when the wireless signals are received, the border antenna 110 receives the electromagnetic waves and converts the electromagnetic waves into current, and the current is transmitted to the circuit board 130 via the feed line 140. The circuit board 130, the feed line 140 and the border antenna 110 jointly transmit and receive the wireless signals.

The feed line 140 includes but is not limited to a conductive plate spring or a elastic probe, such as a pogo pin.

As shown in FIG. 6, a plate spring or elastic probe has elasticity, and the elasticity of the feed line 140 can maintain the connection of the feed line 140 with the circuit board 130 and the border antenna 110, so that the reliability of the connection of the circuit board 130, the feed line 140 and the border antenna 110 is improved, and the stability of wireless signal transmitting and receiving of the border antenna 110 is guaranteed.

In some examples, the feed point 141 of the border antenna 110 is connected with the circuit board 130 through the plate spring or elastic probe.

The circuit board 130, the feed line 140 and the border antenna 110 are jointly used for receiving and transmitting wireless signals in different frequency bands, the wireless signals include but are not limited to wireless fidelity signals, Bluetooth signals, satellite signals, and millimeter wave signals. For example, the border antenna 110 may be used for transmitting and receiving wireless signals in a frequency band ranging from 3.1 GHz to 10.6 GHz, or used for transmitting and receiving wireless signals in a frequency band ranging from 5.925 GHz to 7.125 GHz, or used for transmitting and receiving wireless signals in a frequency band ranging from 2.4 GHz to 2.483 GHz, or used for transmitting and receiving wireless signals with the frequency of 1575.42 MHz or 1228 MHz, or used for transmitting and receiving wireless signals in a frequency band ranging from 26.5 GHz to 300 GHz.

In some examples, the first mounting site 111 includes a groove or a through hole; and/or the second mounting site 121 includes a groove or a through hole.

As shown in FIG. 6, a larger dashed box in FIG. 6 indicates the approximate scope of the first mounting site 111 formed as a groove, namely, the location of the first mounting site 111. The border antenna 110 is provided with a plurality of sound output holes 112 distributed in parallel.

In some examples, the sound output hole 112 and the sound output channel 122 are located in the top of the first mounting site 111.

In one example, in the terminal, "top" refers to a direction close to the display screen (namely a direction facing away from the bottom of the groove), and "bottom" refers to a side facing away from the display screen. The top of the conductive frame may be used for mounting a display screen. Referring to FIG. 6, an opening of the groove faces away from the display screen, a wall of the groove faces the display screen, the sound output hole 112 are located in the top of a wall 113 of the groove, and a part of the wall of the groove is multiplexed as the walls of the sound output hole 112.

Compared with the conductive border in FIG. 4, the sound output hole 112 in the border antenna 110 in FIG. 6 of the example of the disclosure skew towards the direction of the display screen. That is, the first mounting site 111 and the sound output hole 112 are distributed in parallel in the thickness direction of the border antenna 110, and due to the distribution, the thickness space of the conductive border is fully utilized, and the space utilization rate of the border antenna 110 is increased.

An example of the disclosure provides a terminal, including:

the middle frame 100 according to any foregoing example;

a circuit board 130 on the first mounting site 111 of the middle frame 100; and an audio assembly 170 on the second mounting site 121 of the middle frame 100.

In the example of the disclosure, the terminal may be a mobile terminal with an antenna. The terminal includes but is not limited to a mobile phone, a tablet personal computer, a notebook computer, a television or wearable equipment and the like.

As shown in FIG. 6, the border antenna 110 is closer to the edge of the middle frame 100, and is seldom affected by other devices in the terminal, and the radiation efficiency of the border antenna 110 is further guaranteed.

In the example of the disclosure, an audio output assembly generates sound waves, and may be a loudspeaker or other devices.

In some examples, the terminal further includes a rear case 200 mounted on the middle frame 100, the circuit board 130 and the audio assembly 170 are located between the middle frame 100 and the rear case 200.

As shown in FIG. 6, the rear case 200 may serve as a battery case. A battery of the terminal is located between the rear case 200 and the middle frame 100.

In some examples, the terminal further includes a sealing component 150 arranged between the middle frame 100 and the audio assembly 170.

As shown in FIG. 6, the sealing component 150 at least has a dust control effect, can intercept and filter sundries such as dust or cotton wool in the external environment to prevent the sundries from entering the sound output channel 122 via the sound output hole 112, so that the blockage risk of the sound output channel 122 and/or the audio assembly 170 is reduced.

In some examples, the sealing component 150 includes a sealing part 151 and a dust screen 152. The sealing part 151 is arranged between the middle frame 100 and the audio assembly 170, and seals a gap between the middle frame 100 and the audio assembly 170. Two opposite ends of the dust screen 152 are embedded in the sealing part 151, and the dust screen 152 is arranged in the sound output channel 122 in a penetrating manner in a radial direction of the sound output channel 122.

As shown in FIG. 6, the sealing part 151 can at least carry out liquid sealing on the joint between the audio assembly 170 and the middle frame 100. The sealing part 5 can restrict liquid, dust or the like in the sound output channel 122 from entering other internal space of the terminal (for example, an interval between the rear case 200 and the middle frame 100) through the gap between the audio assembly 170 and the middle frame 100. Therefore, the sealing part 151 can reduce the influences of liquid, dust or the like in the external environment on the circuit board 130 or other devices in the terminal are reduced.

It should be appreciated that the sealing part 151 not only can seal the gap between the middle frame 100 and the audio assembly 170, but also can achieve sealing at an insertion position of the dust screen 152.

Unrestrictedly, the sealing part 151 has elasticity, and the sealing part 151 may be compressed by utilizing a pressing force of the middle frame 100 and the audio assembly 170, and thus, the sealing effect of the sealing part 151 is guaranteed.

The sealing part 151 includes but is not limited to foam or silica gel.

As shown in FIG. 6, the sealing part 151 forms a part of the walls of sound output channel 122, namely, one part of the sound output channel 122 is defined by the enclosing of the sealing part 151. The sealing part 151 may be a sealing ring.

As shown in FIG. 6, the dust screen 152 can limit the entrance of sundries such as dust or flying wool into the sound output channel 122 via the sound output hole 112, so that the cleanliness of the sound output channel 122 is improved, and a sound making effect is guaranteed.

The dust screen 152 is arranged in the roughly radial direction of the sound output channel 122 to guarantee that at least part of the dust screen 152 is located in the sound output channel 122 and guarantee the interception effect of the dust screen 152 on impurities such as dust and cotton wool. Unrestrictedly, the roughly radial direction may be the thickness direction of the middle frame 100.

In one example, the sealing component 150 formed by the sealing part 151 and the dust screen 152 is an integrated structure as shown in the smaller dashed frame part in FIG. 6, the edge of the sealing component 150 is fixed between the audio assembly 170 and the middle frame 100 during installation, and steps of installing the sealing part 151 and the dust screen 152 separately is removed, so that the assembling process of the terminal is simplified.

In one example, the terminal is a mobile phone as an example. Compared with the solution as shown in FIG. 5, the solution shown in FIG. 6 is as follows: an audio transmission assembly (namely the audio assembly 170) moves towards the center position of the terminal; the sealing part 151 and the dust screen 152 also move towards the center position of the terminal; and the sound output hole 112 move towards the direction of the display screen. Through structural optimization, an area (namely the first mounting site 111) is constructed between the border antenna 110 and the sealing part 151 to arrange a main board (namely the circuit board 130), and the main board communicates with the border antenna 110 through a plate spring (namely a feed line 140), so that an antenna feed point is arranged at the position. The border antenna 110 is near the positions of the sound output hole 112, and an antenna feed point can be arranged at the same time. Therefore, the degree of freedom of the antenna design is improved. When the solution is applied to an actual mobile phone product, horn sound output hole 112 can be additionally formed in the position of the antenna feed point, so that a single-machine multi-horn function is fulfilled, the sound effect is improved, and the user experience is improved. Alternatively, more antenna feed points are additionally arranged at the position of the horn sound output hole 112, so that the degree of freedom of the antenna design is improved, and the increasingly complex antenna design requirement is better met.

The features disclosed in several product examples provided by the disclosure may be optionally combined without conflict to obtain a new product example.

Those skilled in the art will easily conceive other examples of the disclosure after consideration of the specification and practice of the disclosure disclosed herein. The disclosure is intended to cover any variations, uses, or adaptations of the disclosure, these variations, uses, or adaptations follow the general principles of the disclosure and include common general knowledge or customary technical means in the technical field not disclosed by the disclosure.

It should be understood that the disclosure is not limited to the precise construction that has been described above and shown in the accompanying drawings, and that various modifications and changes may be made without departing from its scope. The scope of the disclosure is limited only by the appended claims.

What is claimed is:

1. A middle frame, comprising:
   a border antenna comprising a feed point configured to be connected with a circuit board;
   a sound output hole in the border antenna, the sound output hole being configured to be connected with an audio assembly;
   a first mounting site configured to accommodate the circuit board; and
   a second mounting site configured to accommodate the audio assembly connected with the sound output hole through a sound output channel; and
   wherein the first mounting site is between the border antenna and the second mounting site the first mounting site and the sound output channel are stacked in a thickness direction of the middle frame, the first mounting site comprises a groove, an opening of the groove faces is configured away from the display screen, a wall of the groove is configured to face the display screen, the sound output hole are located in the top of the wall of the groove, and a part of the wall of the groove is multiplexed as the wall of the sound output hole.

2. The middle frame according to claim 1, wherein the sound output channel penetrates through the middle frame in a direction along a plane of the middle frame.

3. The middle frame according to claim 1, wherein the feed point of the border antenna is connected with the circuit board through a plate spring or an elastic probe.

4. The middle frame according to claim 1, wherein the first mounting site comprises at least one of the groove or a through hole.

5. The middle frame according to claim 1, wherein the second mounting site comprises at least one of a groove or a through hole.

6. A terminal, comprising:
   a middle frame, comprising:
      a border antenna comprising a feed point configured to be connected with a circuit board;
      a sound output hole in the border antenna, the sound output hole being configured to be connected with an audio assembly;
      a first mounting site configured to accommodate the circuit board; and
      a second mounting site configured to accommodate the audio assembly connected with the sound output hole through a sound output channel; and
      wherein the first mounting site is between the border antenna and the second mounting site, the first mounting site and the sound output channel are stacked in a thickness direction of the middle frame, the first mounting site comprises a groove, an opening of the groove faces is configured away from the display screen, a wall of the groove is configured to face the display screen, the sound output hole are located in the top of the wall of the groove, and a part of the wall of the groove is multiplexed as the wall of the sound output hole;

the circuit board disposed on the first mounting site of the middle frame; and the audio assembly disposed on the second mounting site of the middle frame.

7. The terminal according to claim 6, wherein the sound output channel penetrates through the middle frame in a direction along a plane of the middle frame.

8. The terminal according to claim 6, wherein the feed point of the border antenna is connected with the circuit board through a plate spring or an elastic probe.

9. The terminal according to claim 6, wherein the first mounting site comprises at least one of the groove or a through hole.

10. The terminal according to claim 6, wherein the second mounting site comprises at least one of a groove or a through hole.

11. The terminal according to claim 6, wherein the terminal further comprises a sealing component which is between the middle frame and the audio assembly.

12. The terminal according to claim 11, wherein the sealing component comprises a sealing part and a dust screen, wherein the sealing part is between the middle frame and the audio assembly, and seals a gap is between the middle frame and the audio assembly; and two opposite ends of the dust screen are embedded into the sealing part, and the dust screen is arranged in the sound output channel in a penetrating manner in a radial direction of the sound output channel.

13. The terminal according to claim 12, wherein the sealing part comprises foam.

14. The terminal according to claim 12, wherein the sealing part comprises silica gel.

15. The terminal according to claim 6, wherein the terminal further comprises:

a rear case, mounted on the middle frame, wherein the circuit board and the audio assembly are both located between the middle frame and the rear case.

* * * * *